United States Patent
Godar (10) Patent No.: US 11,115,644 B2
(45) Date of Patent: Sep. 7, 2021

(54) VIDEO GENERATION METHOD AND APPARATUS USING MESH AND TEXTURE DATA

(71) Applicant: Sony Interactive Entertainment Inc., Tokyo (JP)

(72) Inventor: Anthony William Godar, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/624,451

(22) PCT Filed: Jun. 14, 2018

(86) PCT No.: PCT/GB2018/051635
§ 371 (c)(1),
(2) Date: Dec. 19, 2019

(87) PCT Pub. No.: WO2019/002824
PCT Pub. Date: Jan. 3, 2019

(65) Prior Publication Data
US 2020/0221070 A1 Jul. 9, 2020

(30) Foreign Application Priority Data
Jun. 29, 2017 (GB) .................................. 1710396

(51) Int. Cl.
*G06T 15/00* (2011.01)
*H04N 13/275* (2018.01)
(Continued)

(52) U.S. Cl.
CPC ........... *H04N 13/275* (2018.05); *G06T 9/001* (2013.01); *H04N 13/161* (2018.05);
(Continued)

(58) Field of Classification Search
CPC ........... G06T 9/001; G06T 15/04; G06T 9/00; H04N 19/597; H04N 13/161;
(Continued)

(56) References Cited

U.S. PATENT DOCUMENTS

| | | | |
|---|---|---|---|
| 2014/0092439 A1* | 4/2014 | Krig | G06T 9/001 358/2.1 |
| 2014/0340404 A1* | 11/2014 | Wang | G06T 19/006 345/427 |
| 2018/0205963 A1* | 7/2018 | Matei | H04N 21/816 |

FOREIGN PATENT DOCUMENTS

EP 2461587 A1 6/2012

OTHER PUBLICATIONS

International Search Report and Written Opinion for corresponding PCT Application No. PCT/GB2018/051635, 12 pages, dated Sep. 25, 2018.

(Continued)

*Primary Examiner* — Weiming He
(74) *Attorney, Agent, or Firm* — Matthew B. Dernier, Esq.

(57) ABSTRACT

A display system for displaying video content, the display unit including a display controller operable to control the display of at least a region of the video content and a visual acuity identification unit operable to identify at least regions of high visual acuity and low visual acuity of a viewer at display positions corresponding to particular regions of the video content, where the display controller is operable to control the display of video content such that regions of high visual acuity are displayed differently to regions of low visual acuity.

14 Claims, 4 Drawing Sheets

(51) Int. Cl.
　　　*H04N 19/20*　　　(2014.01)
　　　*H04N 13/332*　　(2018.01)
　　　*H04N 13/161*　　(2018.01)
　　　*H04N 13/366*　　(2018.01)
　　　*G06T 9/00*　　　(2006.01)
(52) U.S. Cl.
　　　CPC ......... *H04N 13/332* (2018.05); *H04N 13/366* (2018.05); *H04N 19/20* (2014.11)
(58) Field of Classification Search
　　　CPC .... H04N 13/275; H04N 19/20; H04N 13/366; H04N 13/332
　　　See application file for complete search history.

(56) References Cited

OTHER PUBLICATIONS

Smolic A et al: "Representation coding and rendering of 3D video objects with MPEG-4 and H.264/AVC," Multimedia Signal Processing, 2004 IEEE, 6th Workshop on Siena, Italy Sep. 29-Oct. 1, 2004, Piscataway, NJ. USA, IEEE, 4 pages (Sep. 29, 2004).
Farin D., "Depth-image Representation Employing Meshes for Intermediate-View Rendering and Coding", University of Technology Eindhoven, 4 pages, May 2007.
Combined Search and Examination Report for corresponding GB Application No. 1710396.1, 2 pages, dated Nov. 8, 2017.

* cited by examiner

VIDEO GENERATION METHOD AND APPARATUS USING MESH AND TEXTURE DATA

BACKGROUND

This invention relates to a video generation method and apparatus.

There has been a drive in recent years to improve the immersion that is provided to viewers of video and image content. This has led to the production of stereoscopic content, in addition to an increased availability of head-mountable displays (HMDs); each of these can increase the level of immersion experienced by a viewer, especially in when used in conjunction with one another.

However, one problem that may be encountered as a result of an increased sense of immersion is that of a user feeling artificially constrained when attempting to explore or otherwise interact with the virtual reality content. When a user is immersed in content, they may wish to view scenes from different angles or move their viewpoint around within the environment. While this is possible when content is being generated in dependence upon a viewer's location and orientation (such as when playing a game), the ability to provide such functionality may be lacking from pre-generated video content or the like. This results in the user being 'locked into' a particular viewpoint independent of their attempts at interaction, which may result in a loss of the sense of immersion.

SUMMARY

It is therefore desirable to provide an arrangement in which a user is able to experience a virtual environment more fully, even when content is pre-generated independently of a viewer's position and orientation.

The present disclosure provides a method and apparatus for mitigating the above problems.

Various aspects and features of the present invention are defined in the appended claims and within the text of the accompanying description and include at least a display and a method of operating a display, as well as a computer program.

BRIEF DESCRIPTION OF THE DRAWING

Embodiments of the invention will now be described, by way of example only, with reference to the accompanying drawings, in which.

DETAILED DESCRIPTION

Figure 1:
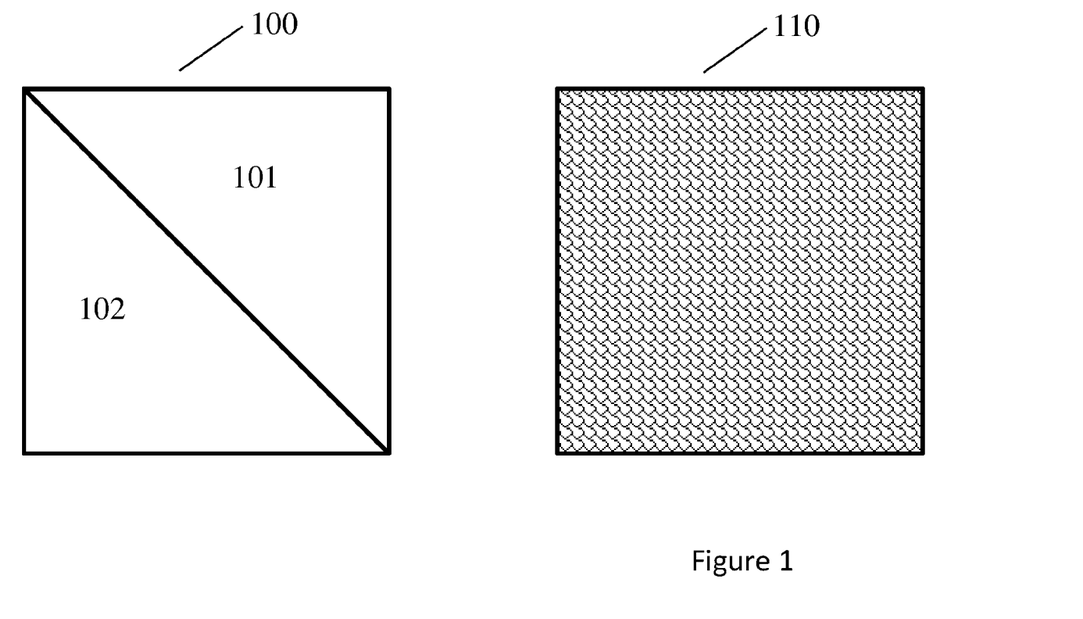
FIG. 1 schematically illustrates a basic mesh and texture.

In many image rendering processes, meshes are used to represent objects and textures are applied to these meshes. FIG. 1 shows a simplified representation of this; the mesh 100 uses two polygons (triangles 101 and 102) to represent a square, while the texture 110 is used to apply image details to the mesh during rendering. In this example, the detail applied by the texture is simply a surface pattern, but textures may also be used to (in additional or as an alternative) make adjustments to the shape of the model or provide reflective properties or the like. Such a method is advantageous in that it may provide high-quality images with a much lower computational cost relative to alternative methods.

Of course, this Figure provides only a simplified example; such a mesh may be used to represent two- or three-dimensional objects of any level of complexity. Indeed, a whole virtual environment may be constructed of one or more such meshes. It should also be noted that a texture may be much more complex than that shown in the Figure.

In many video generating methods, processing is performed to apply textures to meshes to generate image frames suitable for display by a display device. A plurality of such image frames may be provided in sequence in order to generate a video, which is then encoded and ready for playback by a suitable device.

Figure 2:
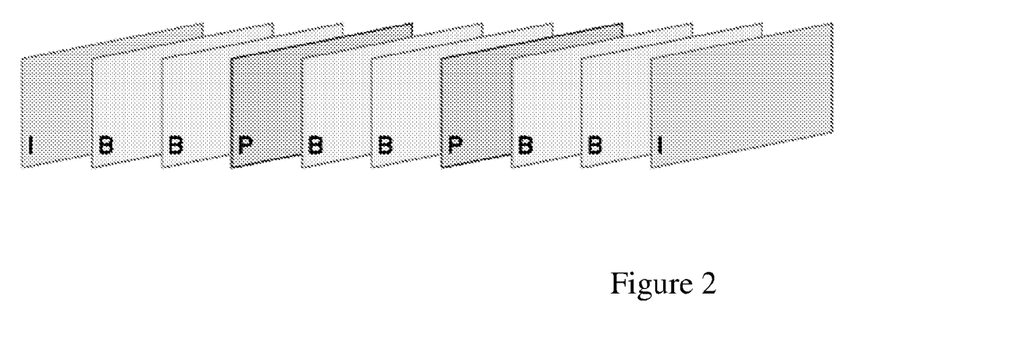
FIG. 2 schematically illustrates a group of pictures structure.

FIG. 2 schematically illustrates such a plurality of generated image frames, arranged in a group of pictures (GOP) structure.

In such a structure, an 'I' (intra coded picture) frame is a frame that is rendered independently of each of the other frames; this image may be decoded and displayed without referencing any other images. 'P' (predictive coded picture) and 'B' (bipredictive coded picture) frames are frames that are encoded using motion-compensated differences with reference to other frames.

In some examples, the first I frame is used to generate the first P frame, and these two frames are used together to generate the first two B frames. Similarly, the first I frame may be used to generate the second P frame, and the third and fourth B frames are generated in dependence upon the P frames either side. However, any suitable prediction scheme may be implemented within the constraints of a particular video coding regime. The order in which the frames are received by a decoder may be different from that of the order in which they are to be displayed; for example, the first P frame should be provided before the first two B frames in the encoding scheme described above, so that all of the frames required for a prediction are available before the prediction is performed.

In existing arrangements, the frames are generated from fully-rendered images so as to reduce the processing burden on decoding devices in generating video content from a received video file. However, as described above, this may be limiting when attempting to provide an immersive video-based experience as by using pre-rendered content for display there is little scope for the display of the content to be responsive to user interaction.

Instead of using fully-rendered images as the basis for the I, P and B frames, the present arrangement instead encodes frames in dependence upon mesh and texture data. Of course, it is not essential that a video file comprises each of I, P and B frames—B frames could be omitted, for example, which may reduce the potential for prediction errors upon reproduction/display of the video content.

Transmitting content in the form of frames comprising mesh and texture data may be advantageous in that this format may be used to provide more information about the scene than image data for a single viewpoint within the scene. For example, by providing mesh and texture data describing a whole object rather than an image showing a single viewpoint of the object, the user may be able to move their viewpoint to see otherwise not-visible parts of the scene (such as peering around an obstacle, rotating the viewpoint to either side or up/down, or being able to look under a table or the like) by indicating that a rotation or translation of the viewpoint is desired.

The proposed arrangement may therefore increase the sense of immersion experienced by the viewer as they are able to change the viewpoint and explore a scene in an expected manner, even in otherwise-conventional video content. In existing arrangements, such an experience is generally reserved for content that is generated in response to a user's head position/orientation or the like, such as in games or other interactive experiences, and is not provided by pre-rendered content.

In some examples of the present arrangement, the amount of mesh and texture data that is provided in these frames is determined by an allowable range of motion of the viewpoint, as determined by a content creator. For example, a 'base' viewpoint (the default viewpoint of the content) may be defined, and then all of the mesh and texture information that is required in order to generate each of the viewpoints within the allowable range may be captured and encoded.

Alternatively, full mesh and texture information for each of the objects in the scene (and/or those which may potentially be in the scene, if they are only visible after a change in the viewpoint by the user) may be captured and encoded; while this may result in a larger file size for the content, it may also reduce the burden on the encoding device.

Figure 3:
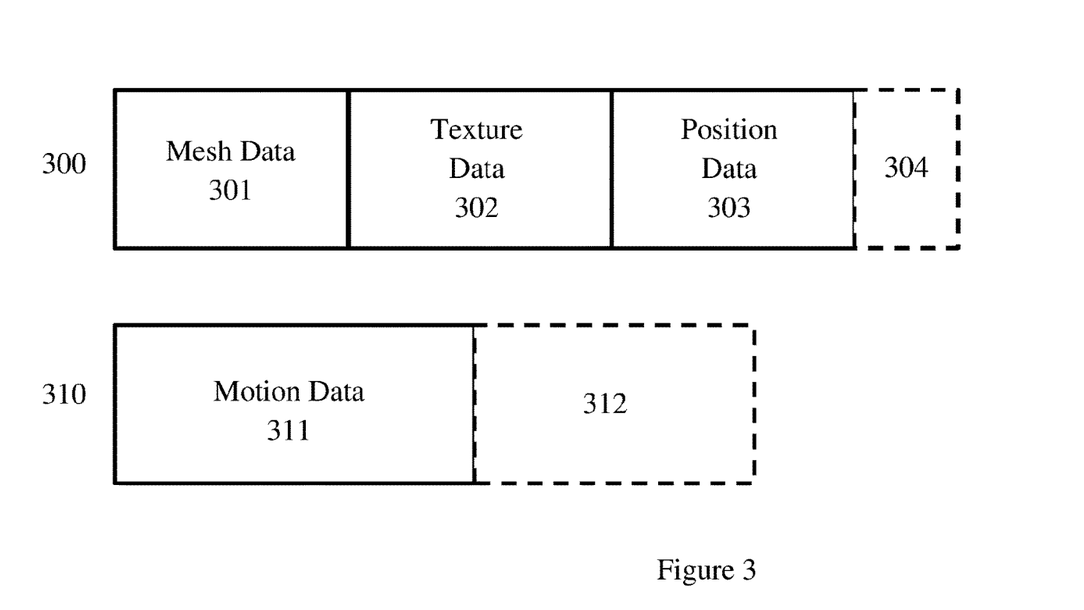
FIG. 3 schematically illustrates a data structure.

FIG. 3 schematically illustrates an I frame 300 and a predictive (such as a P or B) frame 310 according to the present arrangement.

The I frame 300 comprises mesh data 301, texture data 302, position data 303 and an optional data field 304 that may comprise additional metadata or the like.

The mesh data 301 comprises information detailing the structure of polygons that are used to define an object in the frame; this may include the shapes of the polygons (such as triangle or square) and the relative positions and orientations of any number of polygons with respect to other polygons representing the object. The mesh data 301 comprises such information for each object or feature that is (or may be) present in the desired final image.

The format of the information used to generate the mesh data 301 may be selected as is appropriate for the use case. The mesh data 301 may comprise vertex, edge, face and/or surface data. Mesh elements may also be grouped into sub-objects, and one or more areas of the mesh may have a material defined so that the correct shader is used during rendering. UV coordinates may also be provided.

Examples of mesh representations include face-vertex meshes, quad-edge meshes, vertex-vertex meshes and winged-edge meshes; although this should not be seen as limiting, as any suitable representation may be used in conjunction with this disclosure.

The texture data 302 comprises the textures that are associated with the meshes described in the mesh data 301. As described with reference to FIG. 1, this may contain any type of information about the appearance and/or shape of an object described by a mesh. The texture data 302 may be linked to individual elements in the mesh data 301 by use of object IDs, for example, or may be related to a particular position in the scene that corresponds to a position occupied by a corresponding object.

Position data 303 comprises information about the location of meshes and/or textures in a scene. Again, the position data could be related to a particular mesh by virtue of an object ID or the like. Alternatively, a list of objects could be present in the mesh data 301 that correlates with a list of positions in the position data 303 such that the $n^{th}$ entry in the object list has the position specified in the $n^{th}$ entry of the list of positions. The position data could be provided in any suitable coordinate system; for example in virtual world coordinates or based upon the on-screen position. Of course, in some embodiments the position data may not be required; it may be possible to describe a whole scene using a single mesh, for example.

In some embodiments, the position data 303 may further (or alternatively) comprise orientation data for meshes in the scene. For example, this could include up to three different angles (corresponding to roll, pitch and yaw) that may be used to describe the orientation of a mesh. Alternatively, only a subset (zero to two) of these may be required if the mesh is provided at the correct angle in any of the x, y or z planes already.

The optional data field 304 may comprise any other information relating to the content or its playback. For example, the optional data field 304 could comprise metadata about the range of view that is possible (such as a maximum displacement of the user's head) in exploring the virtual scene and/or a default viewpoint position. Any other supplementary information may be provided instead of, or as well as, this information; examples include context information for the content, subtitles, related content information, content source information and file type information.

The second frame 310 shown in FIG. 3 is an example of a predicted frame, such as the P or B frames discussed above. These frames generally comprise no mesh or texture information themselves, instead using the data that is present in the frames 300. The frame 310 comprises motion data 311 and an optional data field 312.

The motion data 311 comprises information about the change in location of objects within the virtual environment. This may be in the form of a new set of position data (and as such may be used to replace the position data 303 of the I frame), or as a set of difference data with respect to the position data 303 associated with the frame from which image corresponding to the frame 310 is generated. Of course, any of a number of other suitable methods of providing motion information for objects within a virtual scene may be utilised.

Alternatively, or in addition, the motion data 311 may describe the motion of the default viewpoint for a frame; in some cases, this may be simpler than describing a corresponding motion for each object within the scene. A combination of describing the motion of the viewpoint and the objects within the scene may be desirable in describing video content with a moving camera and moving objects as this may produce a simplified set of data in which many objects in the scene (generally stationary objects) will have the same motion.

The optional data field 312 may comprise any type of supplementary information, as with that of the optional data field 304 described above. In some embodiments, the optional data field 312 could comprise additional mesh or texture information that may be used to update or otherwise modify the information that was provided in the I frame 300. For example, replacement meshes or textures could be provided (to account for new viewpoints or changing objects over time, such as needing the texture for the previously-unseen rear of an object), or extensions could be provided (such as using streaming meshes to add further mesh data).

Figure 4:
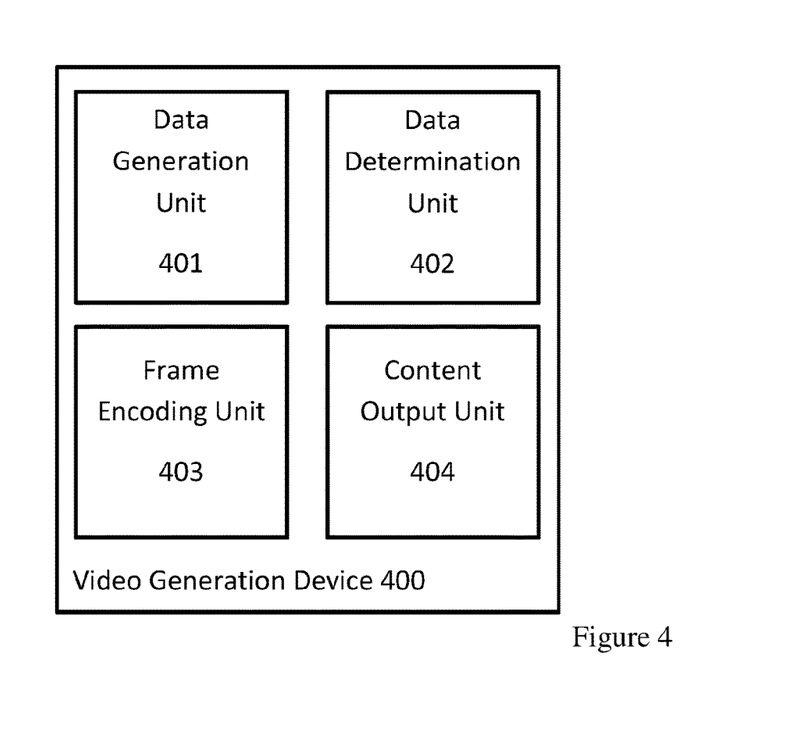
FIG. 4 schematically illustrates a content generation apparatus.

FIG. 4 schematically illustrates a content generating arrangement. This arrangement could be used to generate content corresponding to either single images or a plurality of frames for video content, however this arrangement will be discussed with reference to video generation. The video generation device 400 comprises a data generation unit 401, a data determination unit 402, a frame encoding unit 403 and a content output unit 404.

The data generation unit 401 is operable to generate mesh and texture data for a virtual scene. This is performed by identifying elements in the scene, such as different objects and environmental features, and retrieving the corresponding mesh and texture data from an information source such as a local storage device. In some embodiments, the data generation unit may be operable to generate mesh and texture data for objects in the virtual scene that are occluded or otherwise not visible in one or more viewpoints within the virtual scene; this is particularly advantageous if objects would become visible based on only small movements of the viewpoint by the viewer.

The data determination unit 402 is operable to determine the amount of the generated information that should be included in the frames that are to be generated. For example, if a relatively narrow range of possible viewpoints is defined then it simply may not be possible for a viewer to see particular faces of an object in the virtual scene; for example, if the viewer is stood in front of a house and the viewpoint may only deviate by 10 degrees either side then it will not be necessary to include texture data for the back of the house as it will not be visible in that frame.

In this case, mesh and texture information for such a face may be considered unnecessary (as it is not possible for it to be displayed in this frame) and as such may be left out without consequence. Of course, consideration should be given to the display requirements of later frames which depend on the content of each generated frame, as when objects move between frames these other faces may become visible.

The data determination unit 402 may also be operable to identify objects that are not in the scene at all when displaying a default viewpoint, but which would become visible when a user requests a rotation in the viewpoint. In this case, the meshes of the identified objects would be considered when generating the frames for transmission so as to ensure that data representing all viewable objects is present.

The data determination unit 402, in response to the above considerations, may also be operable to adapt the mesh and texture data accordingly. For example, this may include performing processing to crop meshes and/or textures to remove unnecessary data (such as for un-viewable object faces), or providing the unnecessary portions in a more compressed format or the like. In order to determine which parts of different objects and the like may be viewed at any of the possible viewpoints, it may be advantageous to model the virtual scene to identify occlusions and the like.

The frame encoding unit 403 is operable to encode one or more frames comprising at least a portion of the generated mesh and texture data, wherein the mesh and texture data that is encoded contains information that may be used to describe any of a plurality of different viewpoints within the same virtual scene. The frame encoding unit 403 is operable to produce frames such as those discussed with reference to FIG. 3.

The frame encoding unit 403 may use the data generated by the data generation unit 401 or the data determination unit 402, as is appropriate for the particular use case. The frame encoding unit 403 may also encode additional information, such as that discussed above. For example, the frame encoding unit may be operable to encode, in one or more frames, information indicating a range of possible viewpoints that may be generated using that frame. Alternatively, or in addition, the frame encoding unit may be operable to encode, in one or more frames, information indicating a default viewpoint position within that frame.

The frame encoding unit 403 is operable to generate frames in the manner discussed with reference to FIGS. 2 and 3. This may include generating frames that do not comprise mesh or texture data (such as in the frame 310), and instead comprise predictive information with reference to frames that do comprise such data. As a result, the frame encoding unit may perform processing to identify the differences (such as motion of objects/viewpoints, as described above) between frames that are intended for consecutive display.

This is an example of the frame encoding unit being operable to encode one or more frames comprising information about the change in position of one or more of the meshes in the virtual scene with respect to another encoded frame. However, in some embodiments the frames comprising change in position information for meshes also comprises additional mesh and texture information—as discussed above. When frames such as these are used, the frames output by the frame encoding unit may be arranged in a group of pictures structure such as that described with reference to FIG. 2; the predictive frames which comprise change in position information frames are comparable to the P and B frames.

In some embodiments, each of these types of predictive frames is utilised. For example, P frames may comprise additional mesh and/or texture information to supplement that of the I frames from which they are predicted. The B frames in such an embodiment would comprise change in position information for object meshes, but no additional mesh or texture information.

The content output unit 404 is operable to output the encoded frame data generated by the frame encoding unit 403. In some embodiments, this comprises storing the content in a local storage medium; alternatively, or in addition, this could comprise transmitting the content to a viewer (for example, via a network or over an internet connection).

Figure 5:
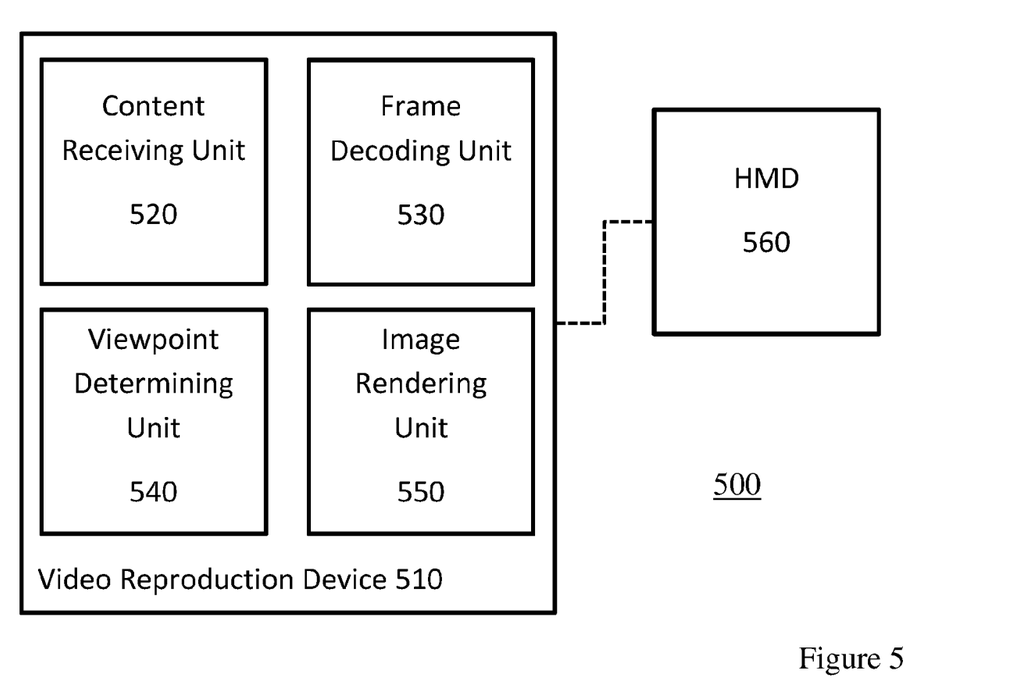
FIG. 5 schematically illustrates a content reproduction apparatus.

FIG. 5 schematically illustrates a content reproduction system. As discussed with reference to FIG. 4, such a system may be used with single images or a plurality of frames that form a video; however, discussion here is in the context of a video reproduction. The video reproduction system 500 comprising a video reproduction unit 510 and an HMD 560. The video reproduction unit 510 comprises a content receiving unit 520, a frame decoding unit 530, a viewpoint determining unit 540 and an image rendering unit 550.

The content receiving unit 520 is operable to receive content comprising frames of mesh and texture data, such as that discussed above. This content may be received via any suitable wired or wireless network connection, or a removable storage medium or the like. For example, the content may be streamed via an online store or provided on a disc.

The frame decoding unit 530 is operable to decode one or more frames comprising mesh and texture data, as received by the content receiving unit 520. This decoding may be performed in any suitable manner, so long as usable mesh and texture data is generated from the received image frames.

The viewpoint determining unit 540 is operable to determine a requested viewpoint for the display of image content relating to a frame. In some embodiments, this comprises determining a deviation of a requested viewpoint from a base viewpoint as defined by the content. For example, in the case of using an HMD as the display, a detected head motion may be characterised in terms of one or more of its type (such as categorisation as either a rotation or translation of the head), magnitude (in degrees or centimetres, for example), velocity, acceleration and/or direction.

In the example of HMD use as a display, a requested change in viewpoint may be identified by performing head motion tracking of the user/HMD. Alternatively, or in addition, a user's controller input, hand gestures or spoken commands could be used to indicate a desired change in viewpoint.

The image rendering unit 550 is operable to generate one or more images for display from the one or more decoded frames in dependence upon a specified viewpoint, wherein the mesh and texture data that is decoded from the one or more frames contains information that may be used to describe any of a plurality of different viewpoints within the same virtual scene.

This image rendering process, as carried out by the image rendering unit 550, may comprise identifying the objects making up a virtual scene that are required for rendering an image for the desired viewpoint, followed by identifying and locating the corresponding meshes in the appropriate locations, and apply the corresponding textures to the meshes.

The HMD 560 is an example of a display unit that may be appropriate for displaying content that is received by the video reproduction device 510; this should not be seen as limiting however, as any display may be appropriate. An HMD 560 is desirable in providing a user with a more immersive viewing experience, as it can tie the navigation of the virtual scene in each frame to the user's head motion; nevertheless, the advantages of the presently disclosed arrangement may be enjoyed using any of a number of different types of display in conjunction with an input device or the like to identify a requested viewpoint.

Figure 6:
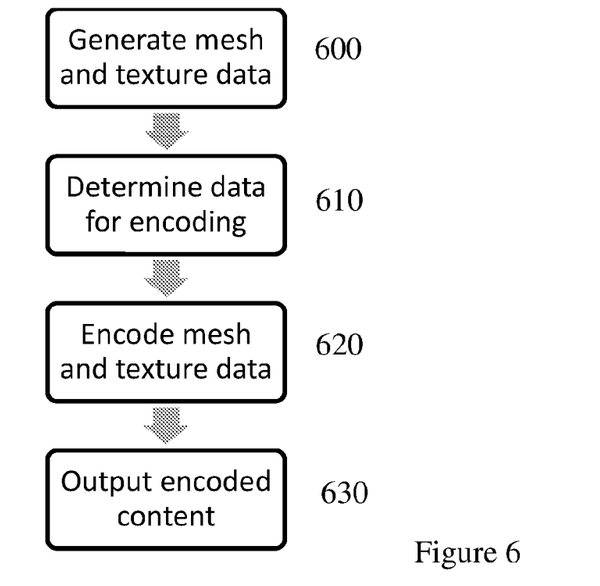
FIG. 6 schematically illustrates a content generation method.

FIG. 6 schematically illustrates a content generating method.

A step 600 comprises generating mesh and texture data for a virtual scene, the mesh and texture information describing at least the potentially-visible objects and features in the environment of the virtual scene.

A step 610 comprises determining the mesh and texture data that is to be encoded. This may be performed in consideration of the portion(s) of the virtual scene that are visible or potentially visible to a viewer for each frame. This step may also comprise the adapting or selecting of mesh and/or texture data that has been generated so as to reduce the amount of redundant data that is encoded.

A step 620 comprises encoding mesh and texture data into one or more frames, wherein the mesh and texture data that is encoded contains information that may be used to describe any of a plurality of different viewpoints within the same virtual scene.

A step 630 comprises outputting the encoded content, for example storing the content in a local storage medium and/or transmitting the content to a viewer.

Figure 7:
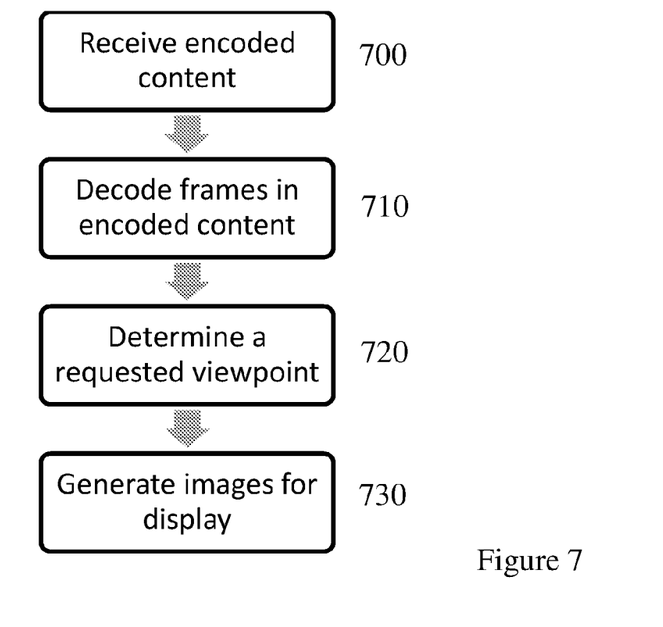
FIG. 7 schematically illustrates a content reproduction method.

FIG. 7 schematically illustrates a content reproduction method.

A step 700 comprises receiving encoded content; this content may be received via any suitable wired or wireless network connection, or a removable storage medium or the like, as discussed above.

A step 710 comprises decoding one or more of the received frames comprising mesh and texture data.

A step 720 comprises determining a requested viewpoint; this serves as the specified viewpoint when generating an image for display. The specified viewpoint may be determined in dependence upon one or more of a user input, instructions present in the received frames, events or objects within the scene and/or a viewer's head position and/or orientation.

A step 730 comprises generating one or more images for display from the one or more decoded frames in dependence upon a specified viewpoint, wherein the mesh and texture data that is decoded from the one or more frames contains information that may be used to describe any of a plurality of different viewpoints within the same virtual scene.

Figure 8:
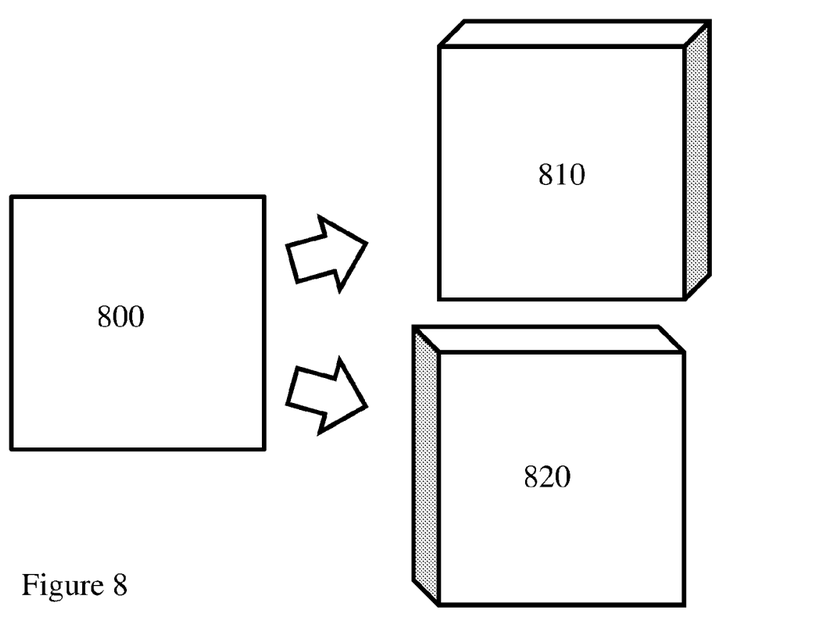
FIG. 8 schematically illustrates a changing viewpoint.

FIG. 8 schematically illustrates an example of a modifiable viewpoint according to the present disclosure.

The square 800 represents an exemplary object in the virtual scene as would be displayed from a default viewpoint described in the content. While shown here as being an entirely two-dimensional object, it is likely that the viewer would be able to identify that it is an object possessing a depth when presented with the image on a display.

The user, by providing some form of input, may be able to peer either side of the object; for example, by indicating a change in the viewpoint up and to the right, the user may be presented with a view of the object as illustrated by the cube 810. Similarly, by indicating a change in the viewpoint up and to the left, the user may be prevented with a view of the object as illustrated by the cube 820.

Of course, the deviation from a default viewing position may be allowed to be much greater than that shown; information could be provided so as to allow the user to move enough to see the back of the object, or see what would be behind them in the virtual scene relative to the default viewing position.

This Figure therefore schematically illustrates a manner in which a viewer is able to examine otherwise-hidden parts of an image using the disclosed arrangement.

The present arrangement may be used for providing single images rather than only being relevant for video content. This may provide an improved viewing experience in the context of in-game screenshots, for example, or indeed any type of image. For example, a plurality of photographs could be captured at different viewpoints in a real environment and used to generate mesh and texture data; this data could then be used to generate a single, navigable image rather than a plurality of images that between them capture the scene.

Video game replays are an example use case of such an arrangement (although the described methods are of course applicable to any video content). The advantages associated with the disclosed arrangement may be particularly beneficial in such a context, as this allows a user to get a different perspective on the in-game action and this may allow them to gain a deeper understanding of how to play the game or at least provide some additional context for the events that are taking place in the video.

It should be appreciated that in many embodiments in which video content is provided according to the methods of the present disclosure, each individual frame may not be itself navigable in any way. This is because during video playback the frame may not be displayed for long enough for a user to indicate any significant change in the requested viewpoint. Instead, the video display is operable to take advantage of the range of viewpoints available for each frame by generating the next image for display with a different viewpoint from the currently displayed image so as to account for the change in requested viewpoint.

In some cases an individual frame is all that is generated; this represents a still image rather than a piece of video content. In such a case, the rendering of the image may be updated with changes in the user's head motion (or another indication of requesting a different viewpoint) without the content itself changing over time.

It is therefore apparent that embodiments exist in which each image or frame is individually navigable, and that embodiments exist in which this is not the case, but that deviations from a default viewing position are possible over a period of display of two or more frames. In some embodiments, each of these may be possible; for example, embodiments with a variable frame rate (such that some frames may be displayed for long enough to be navigable) or in which image content is provided alongside or as a part of video content. Clearly also a user may be allowed to pause playback of a video, such that the current frame changes role from being part of a video sequence to a still image; the system may then output different views for this current frame as the user changes their viewpoint, within the range constraints discussed elsewhere herein.

A specified viewpoint may determined in dependence upon one or more of a user input, instructions present in the image frames, events or objects within the scene and/or a viewer's head position and/or orientation. In general, a combination of these factors is used; for example, instructions present in the image frames could define a default viewpoint (for example, one that focusses on the main event in a scene of a movie) and user inputs (such as head motion) could define a deviation from this.

The occurrence of events in the content could be used to define the specified viewpoint. In some embodiments, information about the occurrence of events may be encoded in the frames. Alternatively, or in addition, processing could be performed by the content reproducing device to identify events in the content—for example, a greater than threshold position change for an object (or a disappearance altogether) or a significant change in the appearance of a texture or the like.

As discussed above, each image or frame may have a maximum deviation from a viewpoint defined. This could be determined in a number of ways; for example, a particular image or video format could define a particular possible deviation that must be provided for each piece of content. Alternatively, or in addition, the maximum deviation from a viewpoint may be defined based upon a user's expected range of motion—in consideration of the type of content or physical considerations, for example.

In one example of this, a viewer is unlikely to require a large range of viewpoint motion when considering a video sequence in which a character is speaking as they are likely to focus on the speaker. However, in a video sequence which depicts travelling in a vehicle the user is likely to be more inclined to look around to see the environment outside of the vehicle. Therefore a larger range of viewpoint motion may be desirable in such a case, and this functionality may be provided by the content generator by including a larger amount of mesh and texture information and/or defining a higher maximum deviation from a default viewpoint.

The correspondence between the requesting of an alternative viewpoint and may be varied in accordance with different applications. In some embodiments, a gearing may be applied such that the same action will not provide the same change in viewpoint for each piece of content. One example of this is in a video in which a very narrow range of possible viewpoints is defined; in such an embodiment it may be advantageous to require a greater head motion (or equivalent indication of a desired change of viewpoint) to generate a particular amount of viewpoint motion. This means that a user may be able to move their head a greater amount before reaching the image boundaries and no longer experiencing a different viewpoint for additional head motion. Of course, if the gearing ratio is too high then it is expected that a user will lose some of the sense of immersion as the change in viewpoint would no longer feel natural due to the discrepancy between expected and actual viewpoint motion.

In such an arrangement, the gearing could be determined upon content reproduction using information about the maximum deviation from the default viewpoint or the like. Alternatively, or in addition, the frame encoding unit generating the content may be operable to encode, in one or more frames, information indicating a gearing ratio between a request for a change of viewpoint and a change in viewpoint to be displayed A further advantage of such an arrangement is in that skipping through video content, such as fast-forwarding or rewinding, may be made more efficient. Rather than having to render an image and then implement the intra-prediction and the like in generating frames other than I frames in a GOP in conventional video content, the data from the I frames here can be combined with the data from the predicted frames prior to any rendering taking place. As a result, only a single image need be rendered as all of the information for generating an image for display may be identified prior to rendering.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

The invention claimed is:

1. A content generation apparatus comprising:
a data generation unit operable to generate mesh and texture data for a virtual scene; and
a frame encoding unit operable to encode one or more frames comprising at least a portion of the generated mesh and texture data,
wherein the mesh and texture data that is encoded contains information that may be used to describe any of a plurality of different viewpoints within the same virtual scene, and
wherein the frame encoding unit is operable to encode, in one or more frames, information indicating a gearing ratio between a request for a change of viewpoint and a change in viewpoint to be displayed.

2. A content generation method according to claim 1, wherein one or more of the frames comprises change in position information for meshes also comprises additional mesh and texture information.

3. A content generation apparatus according to claim 1, in which the frames output by the frame encoding unit are arranged in a group of pictures structure.

4. A content generation apparatus according to claim 1, wherein the frame encoding unit is operable to encode, in one or more frames, information indicating a range of possible viewpoints that may be generated using that frame.

5. A content generation apparatus according to claim 1, wherein the data generation unit is operable to generate mesh and texture data for objects in the virtual scene that are occluded in one or more viewpoints within the virtual scene.

6. A content generation apparatus according to claim 1, wherein the frame encoding unit is operable to encode, in one or more frames, information indicating a default viewpoint position within that frame.

7. A content generation apparatus according to claim 1, wherein the frame encoding unit is also operable to encode one or more frames comprising information about a change in position of one or more of the meshes in the virtual scene with respect to another encoded frame.

8. A content reproduction apparatus according to claim 1, further comprising: a head-mountable display device.

9. A content reproduction apparatus comprising:
a frame decoding unit operable to decode one or more frames comprising mesh and texture data, and comprising information indicating a gearing ratio between a request for a change of viewpoint and a change in viewpoint to be displayed; and
an image rendering unit operable to generate one or more images for display from the one or more decoded frames in dependence upon a specified viewpoint,
wherein the mesh and texture data that is decoded from the one or more frames contains information that may be used to describe any of a plurality of different viewpoints within the same virtual scene.

10. A content reproduction apparatus according to claim 9, wherein the specified viewpoint is determined in dependence upon one or more of a user input, instructions present in the received frames, events or objects within the scene and/or a viewer's head position and/or orientation.

11. A content generating method comprising:
generating mesh and texture data for a virtual scene; and
encoding one or more frames comprising at least a portion of the generated mesh and texture data,
wherein the mesh and texture data that is encoded contains information that may be used to describe any of a plurality of different viewpoints within the same virtual scene, and
wherein the encoding includes encoding one or more frames comprising information indicating a gearing ratio between a request for a change of viewpoint and a change in viewpoint to be displayed.

12. A video reproduction method comprising:
decoding one or more frames comprising mesh and texture data, and comprising information indicating a gearing ratio between a request for a change of viewpoint and a change in viewpoint to be displayed; and
generating one or more images for display from the one or more decoded frames in dependence upon a specified viewpoint,
wherein the mesh and texture data that is decoded from the one or more frames contains information that may be used to describe any of a plurality of different viewpoints within the same virtual scene.

13. A non-transitory, computer readable storage medium containing a computer program which, when executed by a computer, causes the computer to execute a content generating method by carrying out actions, comprising:
generating mesh and texture data for a virtual scene; and
encoding one or more frames comprising at least a portion of the generated mesh and texture data,
wherein the mesh and texture data that is encoded contains information that may be used to describe any of a plurality of different viewpoints within the same virtual scene, and
wherein the encoding includes encoding one or more frames comprising information indicating a gearing ratio between a request for a change of viewpoint and a change in viewpoint to be displayed.

14. A non-transitory, computer readable storage medium containing a computer program which, when executed by a computer, causes the computer to execute video reproduction method by carrying out actions, comprising:
decoding one or more frames comprising mesh and texture data, and comprising information indicating a gearing ratio between a request for a change of viewpoint and a change in viewpoint to be displayed; and
generating one or more images for display from the one or more decoded frames in dependence upon a specified viewpoint,
wherein the mesh and texture data that is decoded from the one or more frames contains information that may be used to describe any of a plurality of different viewpoints within the same virtual scene.

* * * * *